United States Patent
Brännström et al.

(10) Patent No.: US 12,233,888 B2
(45) Date of Patent: Feb. 25, 2025

(54) METHOD AND SYSTEM FOR DEVELOPMENT AND VERIFICATION OF AUTONOMOUS DRIVING FEATURES

(71) Applicant: Zenuity AB, Gothenburg (SE)

(72) Inventors: Mattias Brännström, Gothenburg (SE);
Mathias Westlund, Lerum (SE);
Roozbeh Kianfar, Gothenburg (SE);
Jonas Lundh, Gothenburg (SE);
Cornelis Berger, Gothenburg (SE)

(73) Assignee: Zenuity AB, Gothenburg (SE)

( * ) Notice: Subject to any disclaimer, the term of this patent is extended or adjusted under 35 U.S.C. 154(b) by 382 days.

(21) Appl. No.: 17/069,154

(22) Filed: Oct. 13, 2020

(65) Prior Publication Data

US 2021/0107499 A1  Apr. 15, 2021

(30) Foreign Application Priority Data

Oct. 15, 2019  (EP) ..................................... 19203392

(51) Int. Cl.
*B60W 50/08* (2020.01)
*B60W 50/00* (2006.01)
*B60W 50/04* (2006.01)

(52) U.S. Cl.
CPC ........ *B60W 50/082* (2013.01); *B60W 50/045* (2013.01); *B60W 50/085* (2013.01); *B60W 2050/0094* (2013.01)

(58) Field of Classification Search
CPC .. B60W 50/04; B60W 50/045; B60W 50/082; B60W 50/085; B60W 2050/0094;
(Continued)

(56) References Cited

U.S. PATENT DOCUMENTS

2016/0103450 A1  4/2016  Hogenmueller et al.
2019/0154439 A1*  5/2019  Binder ................... G01B 11/26
(Continued)

FOREIGN PATENT DOCUMENTS

DE   102014220781 A1   4/2016
DE   102018123748 A1   11/2018

OTHER PUBLICATIONS

Extended European Search Report mailed Mar. 24, 2020 for European Patent Application No. 19203392.6, 7 pages.

*Primary Examiner* — Adam D Tissot
*Assistant Examiner* — Aaron K McCullers
(74) *Attorney, Agent, or Firm* — Sage Patent Group

(57) ABSTRACT

The present disclosure relates to a method for controlling a control system of a vehicle having a first driver support module (e.g. ADAS feature) and a second driver support module (e.g. "under-development" ADS feature). The first driver support module and the second driver support module are capable of operation within an overlapping operational design domain (ODD). The method includes obtaining sensor data including information about a surrounding environment of the vehicle and determining fulfilment of the overlapping ODD based on the obtained sensor data. Further, if the overlapping ODD is fulfilled, the method includes switching between a first configuration where the first driver support module is active and the second driver support module is inactive, and a second configuration where the first driver support module is inactive and the second driver support module is active.

13 Claims, 9 Drawing Sheets

(58) Field of Classification Search
CPC ...... B60W 60/00; G01M 17/00; G01M 17/06; G06D 1/00
USPC .......................................................... 701/23
See application file for complete search history.

(56) References Cited

U.S. PATENT DOCUMENTS

| | | | |
|---|---|---|---|
| 2019/0196471 A1* | 6/2019 | Vaughn | G05D 1/0088 |
| 2019/0232955 A1* | 8/2019 | Grimm | B60W 50/14 |
| 2019/0283768 A1* | 9/2019 | Das | G05D 1/0077 |

* cited by examiner

METHOD AND SYSTEM FOR DEVELOPMENT AND VERIFICATION OF AUTONOMOUS DRIVING FEATURES

CROSS-REFERENCE TO RELATED APPLICATIONS

The present application for patent claims priority to European Patent Office Application Ser. No. 19203392.6, entitled "METHOD AND SYSTEM FOR DEVELOPMENT AND VERIFICATION OF AUTONOMOUS DRIVING FEATURES" filed on Oct. 15, 2019, assigned to the assignee hereof, and expressly incorporated herein by reference.

TECHNICAL FIELD OF THE INVENTION

The present disclosure relates to Automated Driving Systems (ADS) and advanced driver-assistance systems (ADAS). More specifically, the present disclosure relates to methods and systems for developing and verifying ADS features or functions.

BACKGROUND

Autonomous systems (AS) have the ability to act independently of direct human control and in unrehearsed conditions. These systems enable a whole range of applications, such as self-driving cars, humanoid robots and post-delivering drones. However, this increased capability and flexibility comes with a price: The difficulty in assessing reliability and safety of autonomous systems.

Traditional testing methods fall short of providing the desired standard levels, mainly due to the combinatorial explosion of possible situations to be analysed. There are strict requirements to ensure that AS are safe and reliable. The safety standards enforce the AS to operate without harmful states and the reliability requirement enforces the system to deliver services as specified. These requirements are generally associated with a low threshold of system failures, i.e. high probability of failure-free operation in a specified environment, which in turn require costly and time-consuming development, validation and verification of the AS.

Today, many vehicles have a variety of driver support functions in the form of advanced driver assistance systems (ADAS). Also, many of these support functions form a basis for current and future automated driving system (ADS) functions (may also be referred to as autonomous driving (AD) functions). Examples of ADAS features or functions include lane departure warning systems, lane centering, lane keeping aid/assist, pilot assist, lane change assistance, parking sensors, pedestrian protection systems, blind spot monitors, adaptive cruise control (ACC), and so forth. These functions supplement the traditional driver control of the vehicle with one or more warnings or automated actions in response to certain scenarios.

Development and verification of ADS solutions is currently very costly and time consuming where a large portion of the work goes into identifying and solving tasks that are challenging for current ADAS features to solve, often referred to as edge cases or corner cases. Examples of corner cases are scenarios with e.g. low standing sun, rain, snow, debris on the road, unexpected objects, unexpected road user actions, dirty sensors, interaction in dense traffic, etc. An additional problem is that solving these corner cases don't give any immediate customer value until the overall performance has reached an acceptable level for safety and availability.

Furthermore, the cost and time for development and verification of ADS is seen as a problem by the Original Equipment Manufacturers (OEMs). They desire ADS to be developed, but in the meanwhile, they wish to increase the customer value of ADAS modules using ADS technology. However, this is easier said than done, as engineers working on ADS need to stay focused on solving corner cases for a very limited Operational Design Domain (ODD) to reach a safety level (at a reasonably fast pace) where ADS can be launched within that ODD.

Moreover, when ADAS become good enough to be perceived as having perfect comfort (by the drivers/consumers) it might fool some drivers into believing that they don't need to supervise the system anymore, that they subconsciously stop supervising the feature, or that they get increased reaction times because they so seldom have to make corrections or intervene the ADAS feature. The more humans rely on automated features, the slower their reaction time becomes to situations that require control, this may sometimes be referred to as the "curse of automation". Thus, improving ADAS beyond this point might lead to more problems than benefits to the customers, and additional requirements on the OEMs to introduce more and more attention support systems to assure that the driver will be able to detect and act on corner cases that the ADAS features/functions fail to deal with.

So, if the corner cases are one of the aspects that separates ADAS from ADS, and ADAS have practically no use of solving all corner cases, then it is a problem to even envision how one is to practically realize an efficient transition from ADAS to ADS.

SUMMARY OF THE INVENTION

It is therefore an object of the present disclosure to provide a method for controlling a control system of a vehicle, a computer-readable storage medium, a control system, and a vehicle comprising such a control system which alleviate all or at least some of the above discussed drawbacks.

More particularly, it is an object of the present disclosure to provide a solution that accelerates the development of both ADS and ADAS, while lowering the cost of verification, and improving data collection. A definition of ADAS and ADS may for example be given by SAE J3016 levels of driving automation.

This object is achieved by means of a method for controlling a control system of a vehicle, a computer-readable storage medium, a control system, and a vehicle comprising such a control system as defined in the appended claims. The term exemplary is in the present context to be understood as serving as an instance, example or illustration.

According to a first aspect of the present disclosure, there is provided a method for controlling a control system of a vehicle having a first driver support module (e.g. ADAS feature) and a second driver support module (e.g. "under-development" ADS feature). The first driver support module and the second driver support module are capable of operation within an overlapping operational design domain (ODD). The method comprises obtaining sensor data comprising information about a surrounding environment of the vehicle, and determining fulfilment of the overlapping ODD based on the obtained sensor data. Further, if the overlapping ODD is fulfilled, the method comprises switching between a first configuration where the first driver support module is active and the second driver support module is inactive, and a second configuration where the first driver support module is inactive and the second driver support module is active. Moreover, the switching between the first configuration and the second configuration is based on a switching protocol in order to perform closed loop testing of the second driver support module for at least portion of a time period that the vehicle is within an environment that fulfils the overlapping ODD. Hereby presenting a method for efficiently bridging the gap between ADAS and ADS development. Moreover, the method may enable for accelerated development of "high performing" ADAS jointly with ADS.

A driver support module may in the present context to be construed as an ADAS feature/function (e.g. adaptive cruise control, automatic parking, hill descent control, lane centering, lane departure warning systems, intersection assistant, etc.) or an ADS feature/function (i.e. "autopilot" configured for a specific ODD). Stated differently, a driver support module may be understood as an automated driving system having a level of automation between 1 and 5 according to SAE J3016 levels of driving automation for on-road vehicles. Naturally, if the product is unverified it cannot be a level 4 or 5 feature as the definition of these levels dictate that no driver intervention should be needed, in those cases the driver support modules may be read as "intended" level 4 or level 5 features.

An Operational design domain (ODD) is to be understood as a description of the operating domains in which an automated or a semi-automated driving system (i.e. AD or ADAS) is designed to function, including, but not limited to, geographic, roadway (e.g. type, surface, geometry, edges and markings), environmental, connectivity, surrounding objects, and speed limitations.

According to an exemplary embodiment of the present disclosure, wherein the first driver support module has a first defined performance level and the second driver support module has a second defined performance level, the first defined performance level being lower than the second defined performance level. One example of a defined performance level may be a verified frequency of failures. Thus, in some embodiments the first driver support module has a first verified frequency of failures and the second driver assistance module has a second verified frequency of failures, the first verified frequency of failures being higher than the second verified frequency of failures. In some embodiments, the first driver support module may be an "ADAS module" and the second driver support module may be an "under development ADS module" (here referred to as an "AD core" module). In some embodiments, the first driver support module may be an Automated Driving System (ADS) function having a first level of driving automation, and the second driver support module may be an ADS function having a second level of driving automation, where the first level is lower than the second level.

Further, according to an exemplary embodiment of the present disclosure, an active driver support module is arranged to generate control signals for a control system of the vehicle in order to control at least one of a steering angle of the vehicle, an acceleration of the vehicle, and a deceleration of the vehicle.

Still further, according to another exemplary embodiment, the switching protocol comprises a predefined time scheme comprising instructions for having the second configuration selected for a duration of 1% to 99.99%, preferably for a duration of 25% to 95%, and more preferably for a duration of 50% to 90% of the time period and having the first configuration selected for a remainder of the time period. An advantage of having the second configuration selected for a duration in the range of 50-90% (preferably 80%-90%) of the time period is that large amounts of data can be used for closed-loop testing with maintained low risk of "curse of automation". In more detail, an increase in available data by a factor 5 to a factor 9 may be achieved as compared to having the second configuration selected for 10% of the time. By using the first configuration for at least a portion of the time period, the driver will keep the ability to supervise the feature with maintained fast reaction times, thus avoiding "the curse of automation". Further, if one compares this with having the second configuration selected for 95-99% of the time, it may result in an insignificant increase of data used for closed-loop testing (less than 10% increase in data when comparing to 90%) but with an increased risk of running into "curse of automation" problems. Moreover, using the second configuration a portion of the time period may herein be referred to as a "grey launch", which is different from a dark launch, where the second configuration is only run in the background.

Thus, the method may comprise a dark launch process for the second driver support module. More specifically, according to an exemplary embodiment of the present disclosure, the method further comprises prior to switching between the first configuration and the second configuration, running the second driver support module in a background configuration while having the first driver support module active in order to perform a verification of a compatibility between the fulfilled overlapping ODD and the second driver support module. This may further increase the overall safety of the solution and mitigate the risk of erroneously launching the second driver support module in the wrong ODD. This may be particularly relevant when the second driver support module is a "not-yet-ready" ADS feature/function since full vehicle control may be given to an ADS of the vehicle.

According to a second aspect of the present disclosure, there is provided a (non-transitory) computer-readable storage medium storing one or more programs configured to be executed by one or more processors of a vehicle control system, the one or more programs comprising instructions for performing the method according to any one of the preceding claims. With this aspect of the disclosure, similar advantages and preferred modules are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present disclosure there is provided a control system for a vehicle. The control system comprises a first driver support module and a second driver support module, wherein the first driver support module and the second driver support module are configured for an overlapping operational design domain (ODD). The control system further comprises control circuitry configured to obtain sensor data comprising information about a surrounding environment of the vehicle, and to determine a current ODD of the vehicle based on the obtained sensor data. Moreover, if the current ODD is the overlapping ODD, the control circuitry is configured to switch between a first configuration where the first driver support module is active and the second driver support module is inactive, and a second configuration where the first driver support module is inactive and the second driver support module is active. The switching between the first configuration and the second configuration is based on a switching protocol in order to perform closed loop testing of the second driver support module for at least portion of a time period that the vehicle is within the overlapping ODD. With this aspect of the disclosure, similar advantages and preferred modules are present as in the previously discussed first aspect of the disclosure.

According to a fourth aspect of the present disclosure, there is provided a vehicle comprising a perception system comprising at least one sensor device configured to monitor the surrounding environment of the vehicle, a localization system configured to determine a geographical location of the vehicle, and a control system according to any one of the embodiments disclosed herein. With this aspect of the disclosure, similar advantages and preferred modules are present as in the previously discussed first aspect of the disclosure.

Further embodiments of the disclosure are defined in the dependent claims. It should be emphasized that the term "comprises/comprising" when used in this specification is taken to specify the presence of stated modules, integers, steps, or components. It does not preclude the presence or addition of one or more other modules, integers, steps, components, or groups thereof.

These and other modules and advantages of the present disclosure will in the following be further clarified with reference to the embodiments described hereinafter.

BRIEF DESCRIPTION OF FIGURES

Further objects, modules and advantages of embodiments of the disclosure will appear from the following detailed description, reference being made to the accompanying drawings, in which.

DETAILED DESCRIPTION

Figure 1A:
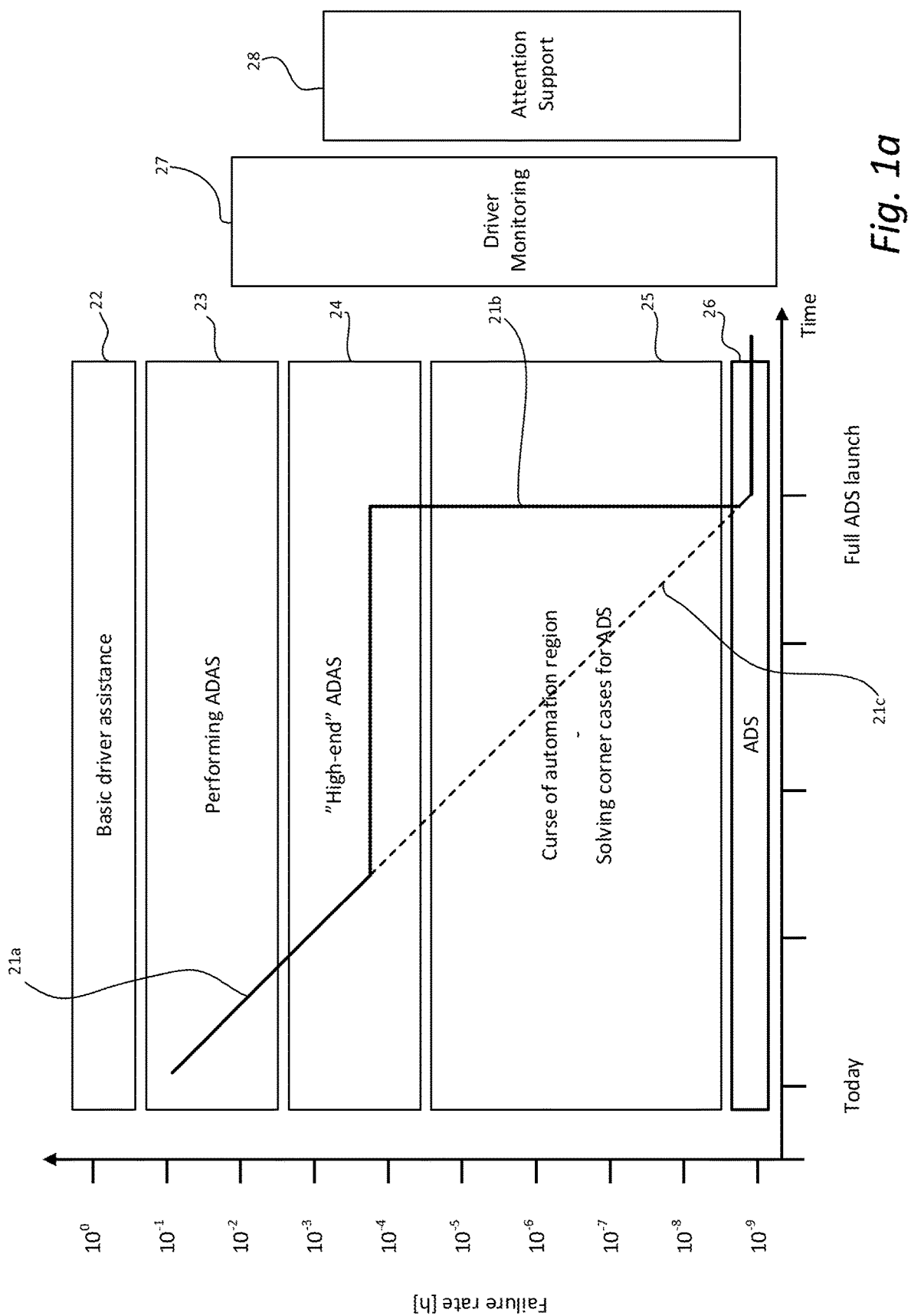
FIGS. 1a-1b are schematic charts illustrating a development from basic driver assistance modules to full autonomous driving over time.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Even though the following disclosure mainly discusses vehicles in the form of cars, the skilled reader readily realizes that the teachings discussed herein are applicable to other forms of vehicles such as trucks, buses and construction equipment.

Figure 1B:
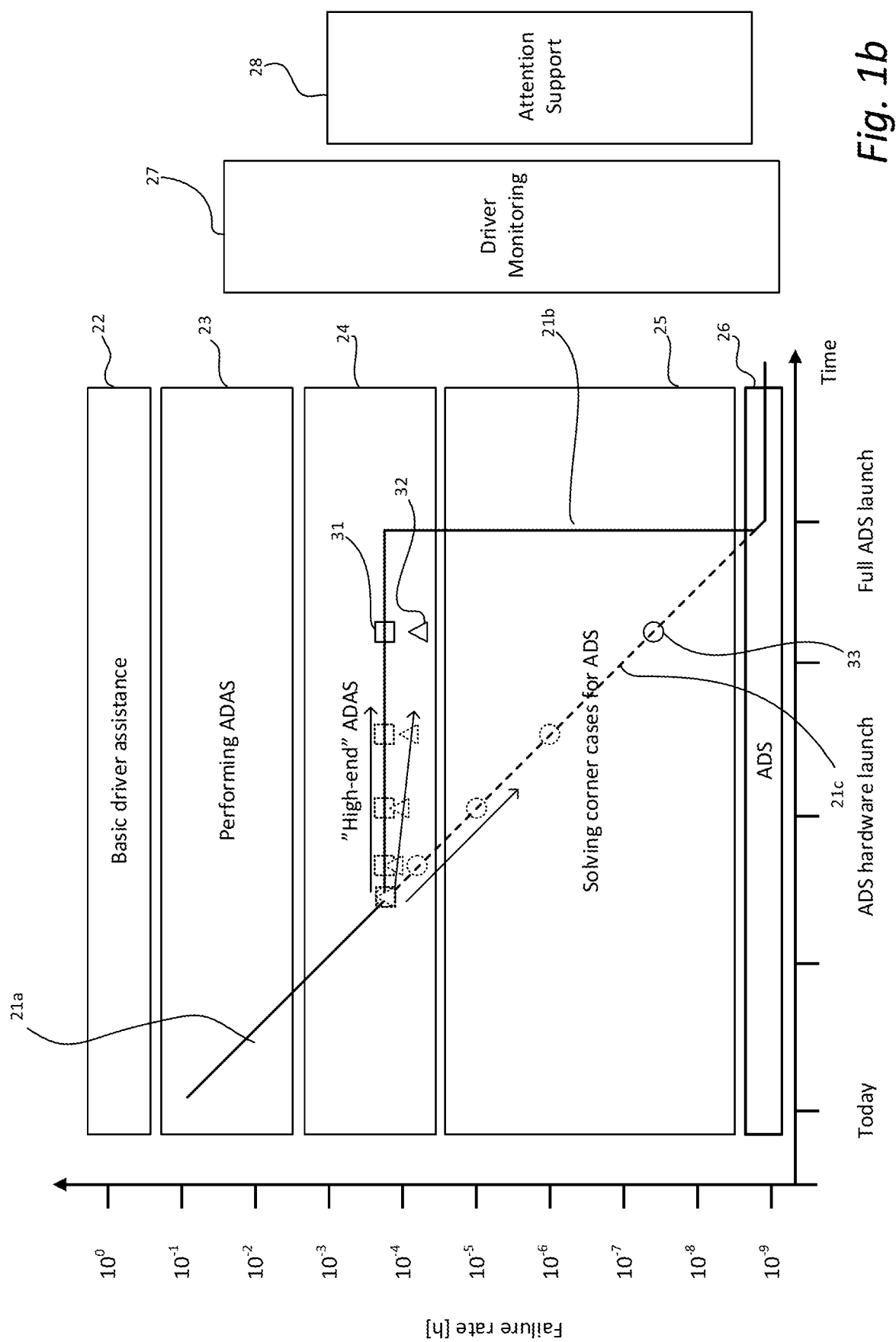

FIGS. 1a-1b are schematic charts that illustrate a development from a basic driver assistance module 22 to a mature ADS module (may also be referred to as an AD module) 26 over time (x-axis) for an arbitrary Operational Design Domain (ODD). The y-axis denotes a probability of failure over driving hours, and more specifically "failures" are in the present context to be interpreted as fatal failures if not corrected by the driver. The FIGS. 1a-1b further contain a set of lines 21a-21c running across the driver support modules 22-26, indicating a path of development/deployment over time.

Note that the number of occasions which require human intervention to avoid incidents and minor accidents can be much higher than the number of "failures". Naturally all such events contribute to how the drivers perceive the feature hence the risk of increased driver reaction times and "curse of automation". Depending on the mix of incidents/failures of difference character and magnitude, the switching protocol may be tuned in different ways to maximize the time that the second driver support module is active without exposing the driver to "the curse of automation".

Data collection plays a key role in enabling an efficient development of high performance or high-end ADAS and ADS modules. It is often mentioned that driven mileage is a good indicator of a maturity level of an ADS module. However, in presently known solutions this data is collected from manually driven vehicles or while an ADAS module is active. In other words, when the intended ADS module is not active.

Thus, the present inventors realized that even though this approach of collecting data from ADAS and manually driven vehicles may work for some software components, it is not as applicable for other aspects such as decision and control components. In fact, one can say that it is crucial for decision and control components to test the complete system in closed loop for verification. Moreover, it may also be advantageous from a perception perspective to perform closed-loop testing since small deviations in lateral control otherwise may lead to situations that the perception system (s) have never been exposed to before and hence to safety and availability problems.

An Operational Design Domain (ODD) may in the present context be understood as a description of the operating domains in which an autonomous or a semi-autonomous driving system (i.e. ADS or ADAS) is designed to function, including, but not limited to, geographic limitations, roadway limitations, environmental limitations, surrounding object limitations, connectivity limitations, and speed limitations.

As mentioned in the foregoing, when moving 21a-21c from ADAS 22-24 (e.g. SAE J3016 driving automation level 1-2) to full ADS 26 (e.g. SAE J3016 driving automation level 5), the development and verification of ADS modules are very costly and time consuming. This is at least partly due to the fact that a lot of attention is focused on identifying and solving corner cases. Corner cases may be understood as situations that need specific design attention in order to be handled in a reasonable and safe manner Some of the corner cases can be frequently occurring while other may be rare. A problem with solving corner cases is the fact that some of them relate to rare situations and are often considered to provide little to no customer value, at least not until the overall performance of the ADS module 26 has reached an acceptable level for safety and availability. However, identifying and solving corner cases is crucial if one is to ever launch an ADS module within a specified ODD.

Moreover, aside from the problems associated with the handling of the corner cases, if one adopts a "linear" development (represented by line 21c) there is a risk of running into the previously mentioned "curse of automation". The curse of automation is in the present context as an induced safety risk during the development stages in the borderlands 25 between "high-end" ADAS 24 and full AD 26. "High-end" ADAS 24 may be understood as a driver support module that the drivers perceive as high performing but not so high that the drivers think that they mentally or physically can drop their attention. Full ADS 26 may be understood as a driver support module that can operate safely without human supervision.

In more detail, this region 25 between "high-end" ADAS 24 and full ADS 26 is more capable than "high-end" ADAS 24 but it is still not verified nor as capable as full ADS 26. Therefore driver support modules residing in this region 25 (may be referred to as "AD core" modules or "underdevelopment" modules) may require more and more driver monitoring and attention support systems 27, 28 to assure that the driver will be able to detect and act on corner cases that cannot be dealt with, which unavoidably introduces additional costs. In other words, the modules residing in these "borderlands" 25 are good enough to be perceived as full ADS 26 and for this reason induce a leniency in driver attention, i.e. the drivers may pay less attention to the traffic situation than necessary, rendering in reduced overall road safety.

The line segments 21a-21c illustrate development paths when going from ADAS to ADS, where the dashed line 21c represent the conventional development approach and the solid lines 21a-21b illustrate a desired "jump" from ADAS to ADS that is to be perceived by consumers/drivers in order to avoid the "curse of automation". Furthermore, FIG. 1b contains a set of boxes 31, triangles 32, and circles 33 where the boxes 31 represent the performance over time for the high-end ADAS 24, the triangles represent the "driver perceived performance" over time, and the circles 33 represent the "AD core" 25 performance over time. In the present disclosure the term "AD core" 25 can be used to denote driver support modules which are in the performance region 25 between "high-end" or "high-performing" ADAS 24 and full ADS 26. The failure rates may vary depending on what the associated requirements are for the corresponding ADAS module 24 and ADS module 26. Moreover, "AD core" 25 can be construed as driver support modules or modules upon which full ADS 26 is to be based. Alternatively, one can view "AD core" 25, as the continuous development of "high-end" ADAS 24 running on "ADS-ready" hardware.

In the following discussion, an ADAS for a first ODD will be referred to as "a first driver support module", and a "not-yet-ready-for-launch" ADS module for a second ODD will be referred to as "a second driver support module". The first and second ODDs are at least partly overlapping, where the overlapping part of the first and second ODDs is referred to as an overlapping ODD, i.e. an ODD within which both modules are capable of operation. The "not-yet-ready-for-launch" ADS module may be an unverified ADS module. Moreover, in accordance with an exemplary embodiment, the first driver support module has a first verified frequency of failures and the second driver assistance module has a second verified frequency of failures, the first verified frequency of failures being higher than the second verified frequency of failures. In other words, the second driver support module has a lower probability of dangerous failure and/or incidents than the first driver support module. In other words, the second driver support module has a higher performance level than the first driver support module (e.g. in terms of dynamic driving task (DDT) capability).

Figure 2:
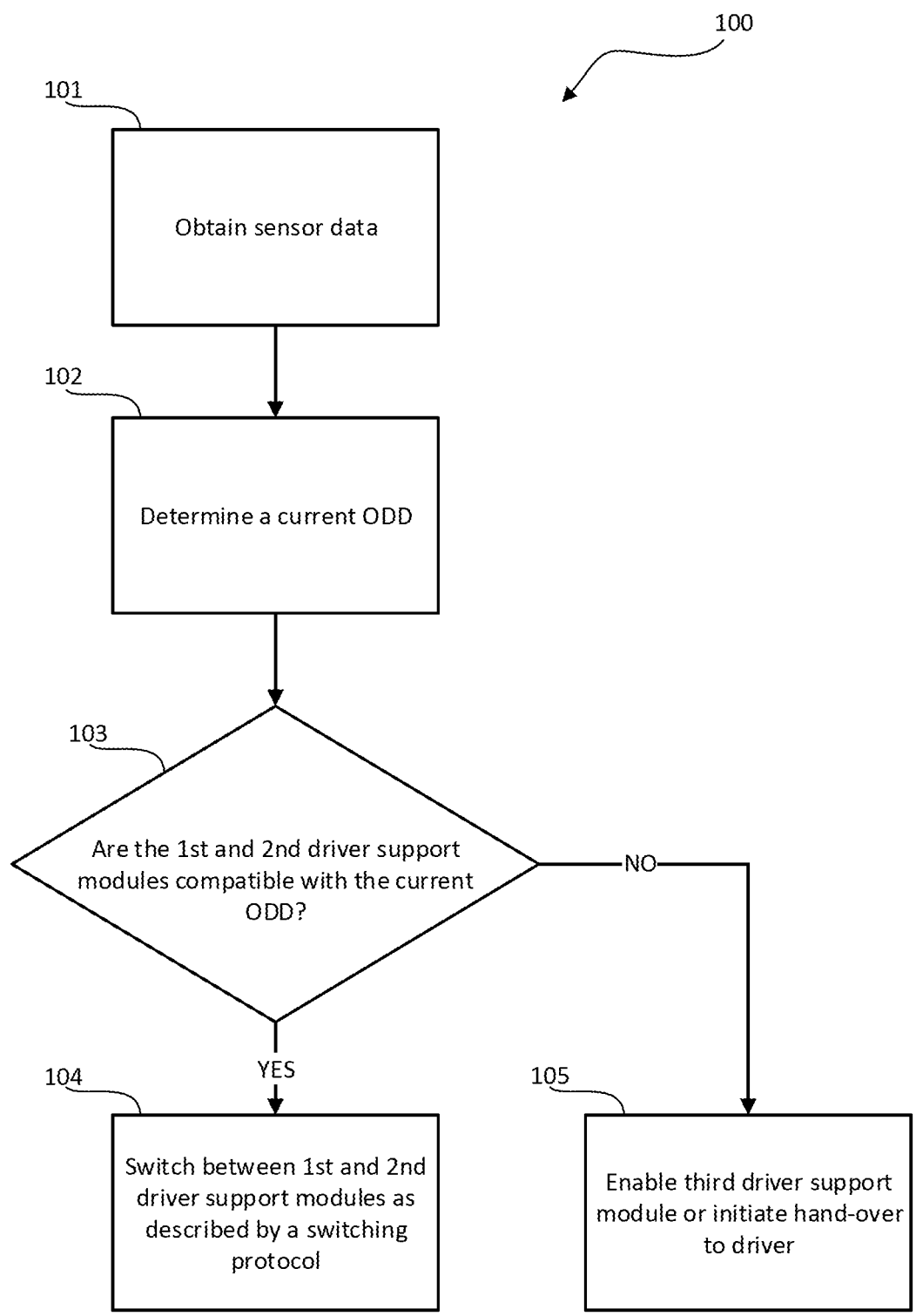
FIG. 2 is a schematic flow chart representation of a method for controlling a control system of a vehicle in accordance with an embodiment of the present disclosure.

FIG. 2 is a schematic flow chart representation of a method 100 for controlling a control system of a vehicle. More specifically, the method 100 is suitable for controlling which, in a selection of control systems, shall be executed in a vehicle. The method 100 is particularly suitable for controlling a vehicle platform by means of a driver support module (may also be known as an automated driving system module, a traffic assist module, or a driver assist module), and simultaneously perform closed-loop testing of not-yet-ready-to-be-launched ADS modules. Moreover, the vehicle has a first driver support module and a second driver support module, wherein the first driver support module and the second driver support module are capable of operation within an overlapping ODD. Stated differently, the first driver support module has a first ODD and the second driver support module has a second ODD, and the first and second ODD are at least partly overlapping. For example, if the first ODD comprises highway, visible lane markings, and speed below 110 km/h km/h, and the second ODD comprises highway, visible lane markings, daytime, and speed below 60 km/h in a traffic jam, then an overlapping ODD would be an ODD fulfilling the following criteria: the vehicle is traveling on a highway with visible lane markings during daytime in a traffic jam and a speed of the vehicle is below 60 km/h. Preferably, the second ODD is fully inside of the first ODD, i.e. the second ODD is a subset of the first ODD.

The method 100 comprises obtaining 101 sensor data comprising information about a surrounding environment of the vehicle. The sensor data may for example be obtained 101 from a perception system and/or a localization system of the vehicle. A perception system is in the present context to be understood as a system responsible for acquiring raw sensor data from on sensors such as cameras, LIDARs and RADARs, ultrasonic sensors, and converting this raw data into scene understanding. Naturally, the sensor data may be received directly from one or more suitable sensors (such as e.g. cameras, LIDAR sensors, radars, ultrasonic sensors, etc.). The localization system is a system configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. The term sensor data also includes data obtained from an HD map where information about the surrounding environment may be based on the vehicle's map position (derived from its geographical position). The term obtaining is herein to be interpreted broadly and encompasses receiving, retrieving, collecting, acquiring, and so forth.

Further, a determination of a fulfilment of the overlapping ODD based on the obtained sensor data is performed. This, may be done by determining 102 a current ODD of the vehicle 102 based on the obtained 101 sensor data, and subsequently checking 103 whether the vehicle is currently in an ODD that the first and second driver support modules are compatible with or capable of operating within. Stated differently, the method may comprise checking 103 whether or not the determined 102 current ODD is an "overlapping ODD".

Then, if the determined 102 current ODD is an overlapping ODD, the method 100 comprises switching 104 between a first configuration where the first driver support module is active and the second driver support module is inactive, and a second configuration where the first driver support module is inactive and the second driver support module is active. The switching 104 between the first configuration and the second configuration is based on a switching protocol in order to perform closed loop testing of the second driver support module for at least portion of a time period that the vehicle is within the overlapping ODD.

Stated differently, once it is confirmed that the vehicle is in an ODD compatible with both of the first driver support module (e.g. "high-end" ADAS) and second driver support module (e.g. "AD core"), then the control of the vehicle platform is divided between the ADAS and the AD core according to the switching protocol. For example, the switching protocol may be a predefined time scheme that dictates that the second driver support module assumes control for 50%-90% of the time period that the vehicle is within the overlapping ODD.

However, if it would be determined 103 that the current ODD of the vehicle is not an ODD compatible with either one or both of the first and second driver support modules, then the method may comprise various fall-back alternatives. For example, if the current ODD is an ODD that neither one of the first and second driver support modules are capable of operating within, e.g. due to the vehicle exiting the overlapping ODD, then the method 100 may comprise enabling or activating 105 a third driver support module (ADAS or AD) configured for the current ODD or to initiate 105 a hand-over to the driver. Accordingly, the requirement to ensure that the vehicle stays within a specific ODD may be alleviated since the method 100 also may comprise a "safety net" if the vehicle unexpectedly or deliberately leaves the "overlapping ODD". Naturally, in a scenario where the first driver support module is capable of operating within the current ODD and the second driver support module is not capable of operating within the current ODD (i.e. overlapping ODD is not fulfilled, but an ODD of the first driver support module is fulfilled), then the first driver support module may be active while the second driver support module is suppressed. This will be further exemplified in reference to FIG. 3b.

Naturally, the determination of a fulfilment of the overlapping ODD may be performed after the first and second driver support modules are selected without departing from the scope of the present disclosure. For example, a driver may select operation of a first driver support module, then a check is performed if the vehicle is within an ODD that the first driver support module is capable of operating within. Moreover, another check is performed to see if a second driver support module is capable of operating within the current ODD. Accordingly, if it is determined that the vehicle is currently within an "overlapping ODD" of the first and second driver support modules, then the switching procedure 104 may be initiated.

Referring back to FIG. 1b, an effect of this "switching" is illustrated by the boxes 31, triangles, 32 and circles 33. As mentioned, the boxes 31 represent the projected performance over time for the high-end ADAS 24, the triangles 32 represent the projected "driver perceived performance" over time, and the circles 33 represent the projected "AD core" 25 performance over time. As discussed in the foregoing, a challenge when trying to move from ADAS to a mature AD module, is the "curse of automation" problem, which predicts that the perceived quality of the control system is so good that it induce a "false sense of safety" in the driver, causing him or her to pay less than needed attention to the surrounding traffic even though the control system is not yet secure enough to be operated without supervision.

Moving on, as indicated by the circles 33, over time the development of the "AD core" segment will continue and improve in terms of failure rates, while the "high-end" ADAS remains at a static performance level for that ODD. However, by switching the control system between the "high-end" ADAS and the "AD core" the "perceived performance" by the driver can stay outside "curse of automation zone" 25.

Moreover, the switching protocol may comprise a predefined time scheme comprising instructions such that the second configuration is selected for a duration of 25% to 95% of the time period, or more preferably for a duration of 50% to 90% of the time period, while the first configuration is selected for the remainder of the time period. This is because gain in the form an increase of closed-loop testing hours when going from 90% to e.g. 99% is low in comparison with the downside of increased risk of moving the projected "perceived performance" 32 to the "curse of automation" region 25. The time period is here to be understood as a period of time that the ODD requirement of both the first and second driver support modules is fulfilled, or in other words, a period of time that the vehicle is within an ODD overlap of the first and second driver support modules.

Figure 3A:
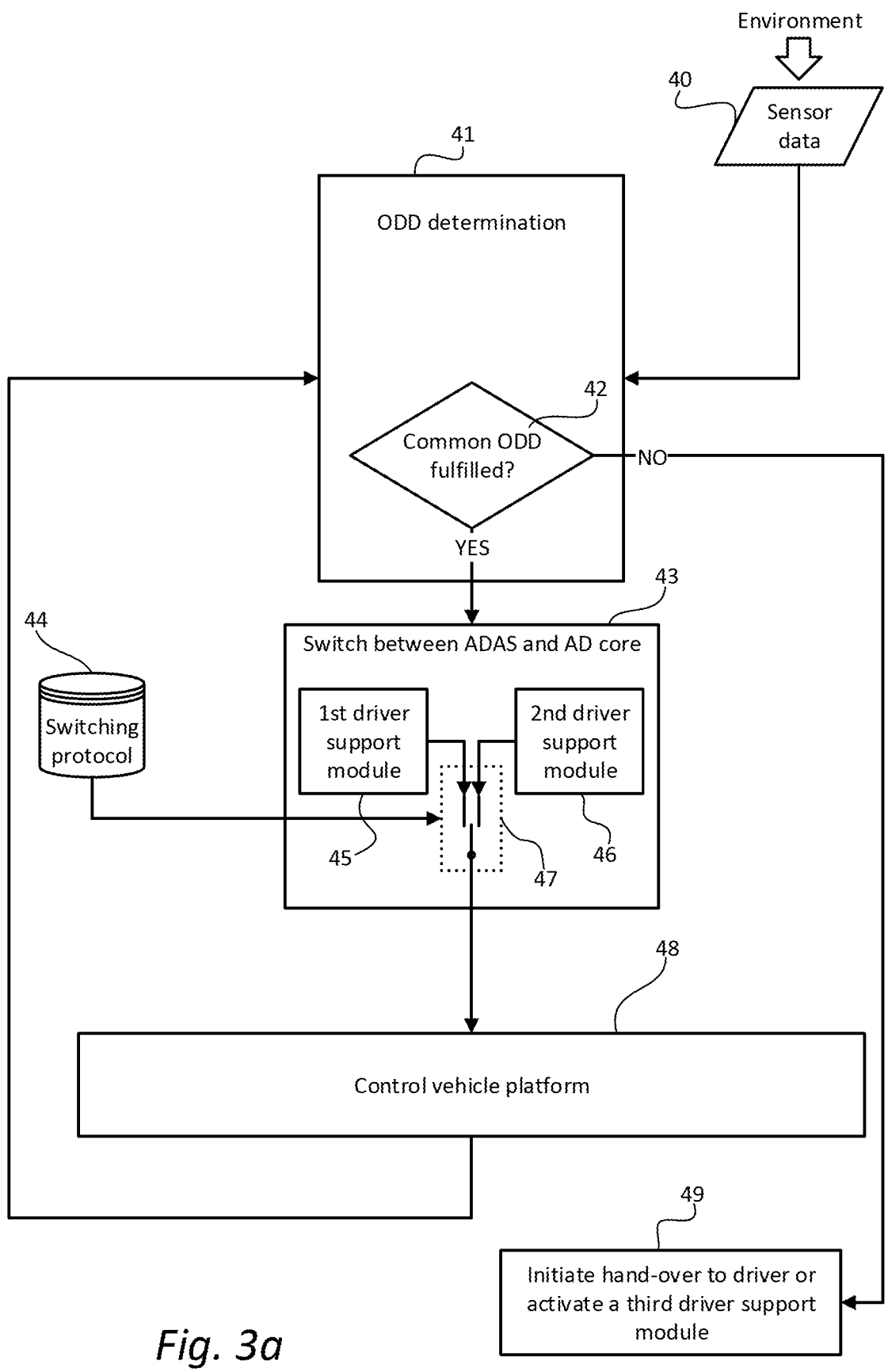
FIG. 3a is a schematic flow chart representation of a method to be executed by a control system of a vehicle in accordance with an embodiment of the present disclosure.

FIG. 3a is a schematic flow chart representation of a method to be executed by a control system of a vehicle in accordance with an embodiment of the present disclosure. The control system is suitable for enabling closed-loop testing of not-yet-launched ADS modules for specified ODDs. The control system comprises a first driver support module 45 and a second driver support module 46. Both of the first and second driver support modules 45, 46 are capable of operating within an overlapping operational design domain (ODD). According to an exemplary embodiment of the present disclosure, the first driver support module 45 has a first defined performance level and the second driver assistance module 46 has a second defined performance level that is higher than the first defined performance level.

Further, the control system comprises suitable control circuitry (may also be referred to as a control unit, control circuit, controller, processor(s), etc.) for executing various functional steps as will be described in the following. The control circuitry is configured to obtain sensor data 40 comprising information about a surrounding environment of the vehicle. Further, the control circuitry is configured to determine a fulfilment of the overlapping ODD based on the obtained sensor data. The system may comprise an ODD determination module 41 for this task. Once the current ODD is determined, then a check may be performed 42 to determine if the overlapping ODD is fulfilled (i.e. if both of the first and second driver support modules 45, 46 are compatible with the current ODD).

If the overlapping ODD is fulfilled, then the control circuitry is configured to switch 43 between a first configuration where the first driver support module is active and the second driver support module is inactive, and a second configuration where the first driver support module is inactive and the second driver support module is active. Stated differently, the control circuitry is configured to control a switching function 47 so to switch between the first configuration and the second configuration.

Furthermore, the switching 43 between the first configuration and the second configuration is based on a switching protocol 44 in order to perform closed loop testing of the second driver support module for at least portion of a time period that the vehicle is within an environment that fulfils the overlapping ODD. An active driver support module 45, 46 may in the present context be understood as that the active driver support module is arranged to generate control signals for a control system 48 of the vehicle in order to control at least one of a steering angle of the vehicle, an acceleration of the vehicle, and a deceleration of the vehicle. In contrast, an "inactive" driver support module does not control any manoeuvres of the vehicle. An "inactive" driver support module may however still be "generating control signals" but these control signals are not used as input to a vehicle platform (i.e. not used to manoeuvre the actual vehicle). Instead, the generated control signals of the "inactive" module may be used to verify its compatibility between the fulfilled overlapping ODD by running it in "a background mode", i.e. a dark launch may be performed.

Naturally, the "switching" may be realized in various ways and does not necessarily only include abrupt switching between the driver support modules 45, 46. Instead, in some embodiments, the switching protocol 44 may include some overlap such that the control is "faded" in and out from driver support modules, in order to reduce the risk of jerk or passenger discomfort. Stated differently, in the transition between the first configuration and the second configuration a blend of output (signals) from the first and second driver support modules 45, 46 may be used to get a smooth transition. For example, the switching protocol 44 may include a transition phase of 0-3 s within which the outputs from the first and second driver support modules 45, 46 is blended/mixed.

Moreover, the switching protocol 44 may comprise a predefined time scheme comprising instructions for having the second configuration selected for a duration of 1% to 99%, preferably for a duration of 25% to 95%, and more preferably for a duration of 50% to 90% of the time period; and having the first configuration selected for the remainder of the time period. The predefined time scheme may be configured such that specific time portions of the time period are reserved for the first configuration (e.g. first 5% and last 5% or for 1 minute every 10 minutes).

Alternatively, the predefined time scheme may be dynamic (or randomized) such that the time portion that is reserved for the first configuration is distributed randomly throughout the time period. Here, the method may further comprise a step of determining/predicting/estimating a time period that the vehicle will be in an environment that fulfils the overlapping ODD.

Figure 3B:
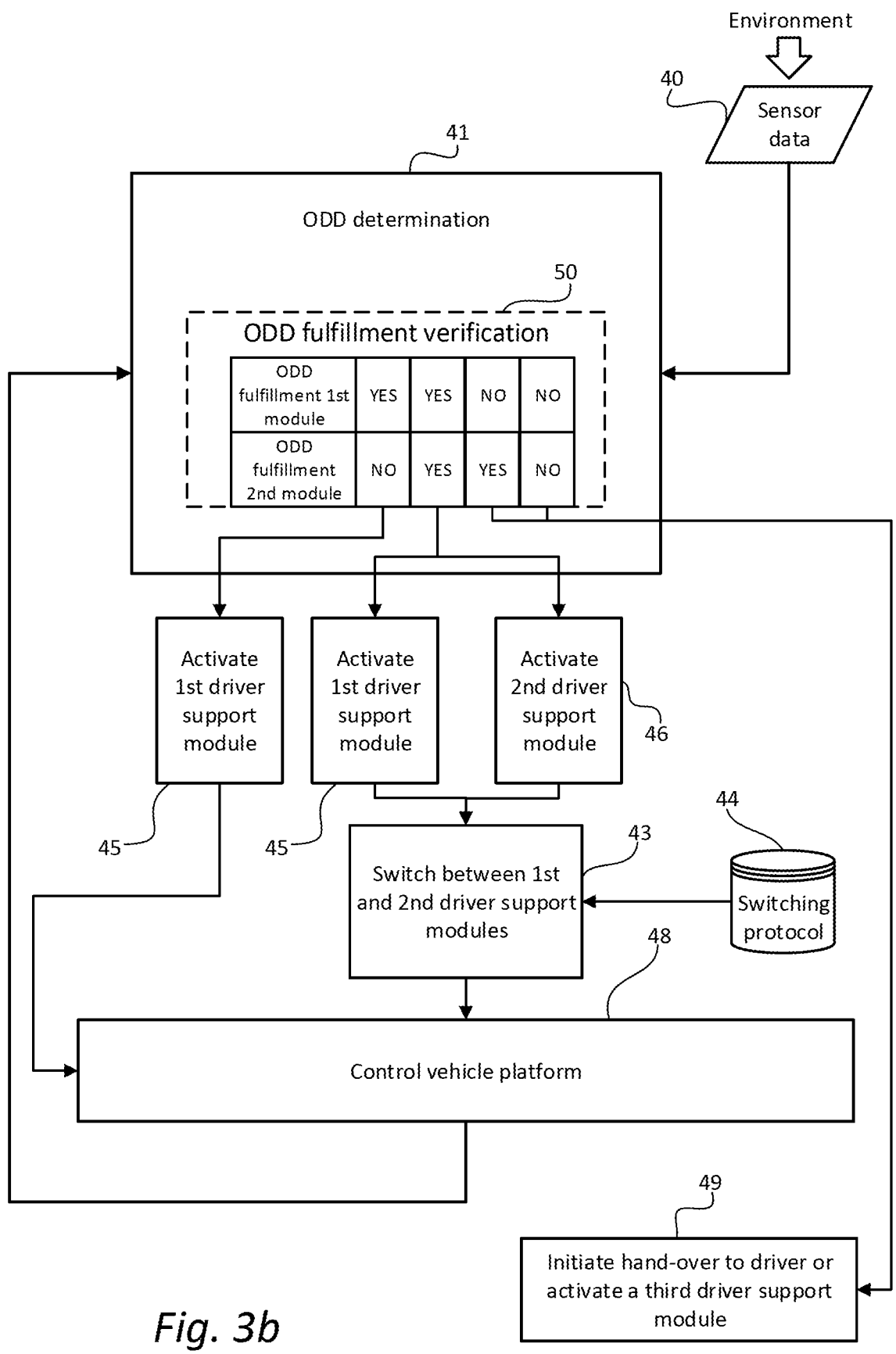
FIG. 3b is a schematic flow chart representation of a method to be executed by a control system of a vehicle in accordance with an embodiment of the present disclosure.

FIG. 3b is a schematic flow chart representation of a method for controlling a control system of a vehicle in accordance with another embodiment of the present disclosure. Several features and functions of the embodiment of FIG. 3b have already been described in detail in the foregoing with reference to FIG. 3a and will for the sake of brevity and conciseness not be discussed in any explicit detail. Focus will instead be put on the differentiating parts, and in particular to the ODD determination module 41 and to the determination of the ODD fulfilment 50 and consequences of various scenarios. Analogously as discussed before the first driver support module is a verified and deployed ADAS function while the second support module is an "AD core" function, i.e. an unverified/unfinished ADS function.

In more detail, the ODD determination 41 comprises a step of verifying 50 an ODD fulfilment of the first and second driver support modules respectively. The verification is presented as a table illustrating four different scenarios. In a first scenario, the ODD of the first driver support module is fulfilled while the ODD of the second driver support module is not fulfilled. Accordingly, in the first scenario, the first driver support module may be activated 45 and used to provide 48 control signals to the vehicle platform (e.g. control of longitudinal/lateral motion). In a second scenario, the ODD is fulfilled for both of the first and second driver support modules (i.e. an overlapping ODD is fulfilled). Thus, in the second scenario both of the first and second driver support modules are activated 45, 46 and the switching 43 between the first and second configuration based on the switching protocol 44 is executed while the vehicle is within an environment that fulfils the overlapping ODD.

In a third scenario, the ODD of the first driver support module is not fulfilled while the ODD of the second driver support module is fulfilled. Since the second driver support module is an unverified/unfinished function, it is not allowed to control 48 the vehicle platform alone. Thus, in the third scenario a hand-over to a driver of the vehicle or a third driver support module may be activated (if the ODD of the third driver support module is fulfilled). In a fourth scenario, none of the ODDs of the first and driver support modules are fulfilled, and the consequence is the same as for the third scenario.

Figure 4:
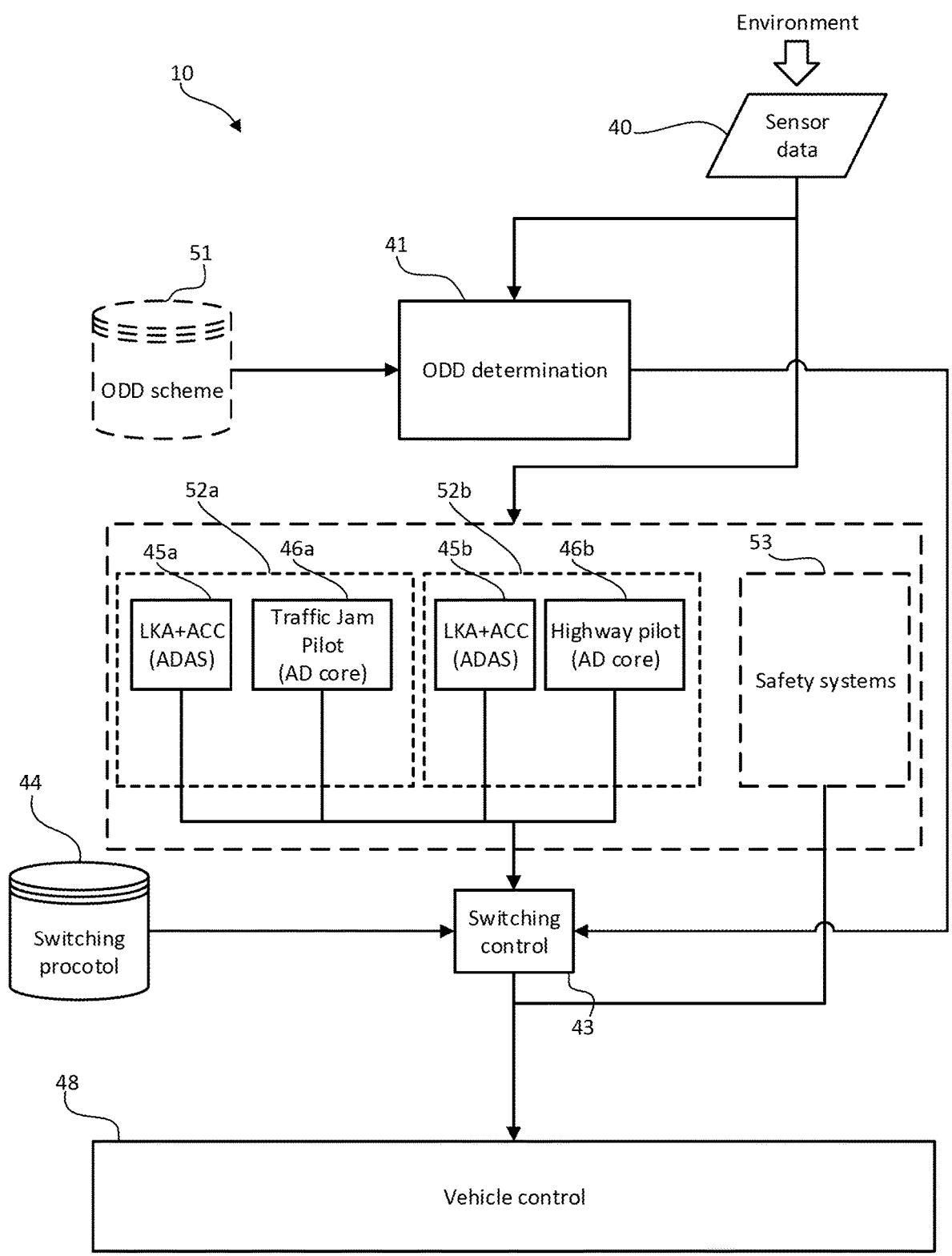
FIG. 4 is a schematic block diagram representation of a method for controlling a control system of a vehicle in accordance with an embodiment of the present disclosure.

FIG. 4 is a schematic block diagram representation of a control system 10 for a vehicle in accordance with an embodiment of the present disclosure. The control system 10 has a first driver support arrangement 52a, and a second driver support arrangement 52b. The first driver support arrangement 52a comprises a first driver support module, in the form of an ADAS lane keeping assist (LKA) and adaptive cruise control (ACC) 45a, and a second driver support module, in the form of a traffic jam pilot 46a. The ADAS LKA+ACC 45a can here be considered as a "low-level" traffic jam pilot. Both of the ADAS LKA+ACC 45a and the traffic jam pilot 46a are capable of operation within a first overlapping ODD. Further, the control system 10 has a second driver support arrangement 52b comprising a first driver support module, in the form of an ADAS lane keeping assist (LKA) and adaptive cruise control (ACC) 45b, and a second driver support module, in the form of a highway pilot 46b. Analogously, the ADAS LKA+ACC 45b and the highway pilot 46b are capable of operation within a second overlapping ODD. The two ADAS LKA+ACC modules 45a, 45b may be realized as a single module, but are here illustrated as separate units for clarity.

In more detail, the first driver support arrangement 52a can be construed as a traffic jam support module comprising a verified ADAS module 45a (i.e. "low performance" driver support feature) and an unverified ADS module 46a (i.e. "high performance" driver support feature). Accordingly, in a scenario where the ODD is assumed to be a traffic jam scenario (e.g. multiple lanes, speed <30 km/h, clear lane markings, dense traffic), the two driver support modules 45a, 46a may have an overlapping ODD in specific situations, whereupon the switching between the two driver support modules 45a, 46a as described herein can be initiated. Analogously, the second driver support arrangement 52b can be construed as a highway support module comprising a verified ADAS module 45b (i.e. "low performance" driver support feature) and an unverified ADS module 46b (i.e. "high performance" driver support feature).

The system further has control circuitry configured to obtain sensor data 40, and to determine a current ODD (i.e. to verify a fulfilment of an overlapping ODD) based on the obtained sensor data 40. The ODD determination may be performed by a dedicated ODD determination module 41. Similar to the embodiment discussed with reference to FIGS. 3a-3b, the control circuitry of the control system 10 depicted in FIG. 4 is configured to switch 43 between a first configuration where the first driver support arrangement 45a, 45b is active and the second driver support arrangement 46a, 46b is inactive, and a second configuration where the first driver support arrangement 45a, 45b is inactive and the second driver support arrangement 46a, 46b is active. Moreover, the switching between the first configuration and the second configuration is based on a switching protocol 44 in order to perform closed loop testing of the second driver support arrangement 46a, 46b for at least portion of a time period that the vehicle is within the overlapping ODD.

Further, the control system 10 has one or more safety systems 53 configured to generate control signals to the vehicle platform 48 in order to manoeuvre the vehicle in case of emergency (e.g. collision avoidance, emergency braking, etc.). The one or more safety systems 53 may be arranged to be able to override any control signals generated by the driver support 52a, 52b.

Executable instructions for performing these functions are, optionally, included in a (non-transitory) computer-readable storage medium or other computer program product configured for execution by one or more processors.

Figure 5:
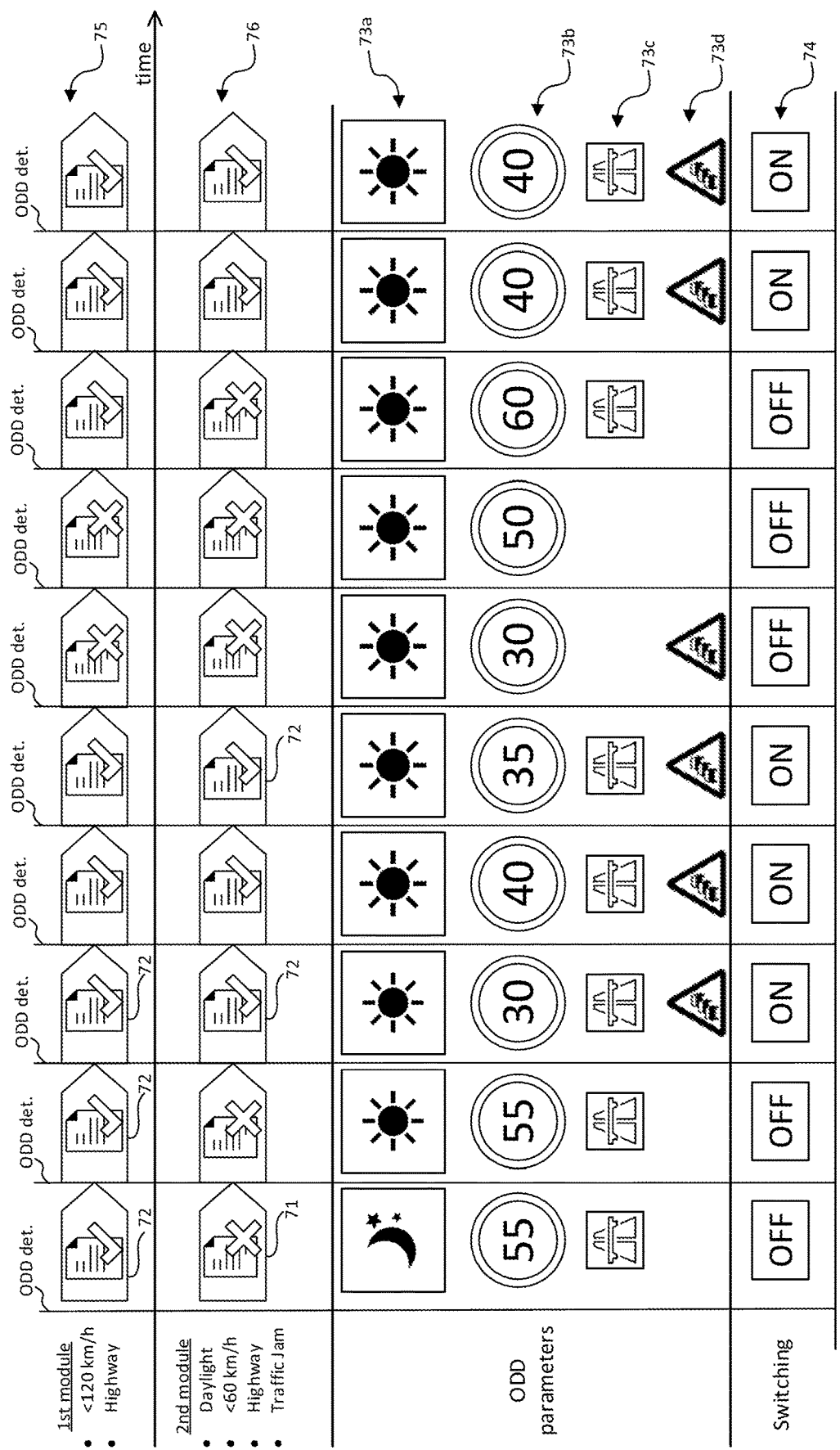
FIG. 5 is a schematic diagram illustrating a method for controlling a control system of a vehicle according to an embodiment of the present disclosure.

FIG. 5 is a schematic diagram illustrating a method for controlling a control system of a vehicle according to an embodiment of the present disclosure. More specifically, FIG. 5 illustrates an example of how the determination of ODD fulfilment may be realized. The vehicle is provided with a first driver support module and a second driver support module. The first driver support module (top row) may be in the form of a low speed highway assist. More specifically, the first driver support module may be configured to control the DDT of the vehicle (i.e. sustained lateral and longitudinal vehicle motion control) at low speeds on a highway, but will rely on the driver to complete object and event detection and response (OEDR). The first driver support module is capable of operating within a first ODD having a first set of predefined ODD metrics: The vehicle is traveling on a highway (e.g. controlled-access highway) at a speed below 120 km/h. The second driver support module (second row from the top) may be an unverified (or "under development") ADS module in the form of a traffic jam pilot.

More specifically, the second driver support module may be configured to control the DDT, the OEDR, and a DDT-fall back (i.e. automatically achieving a minimal risk condition when necessary) without any expectation of driver-intervention. The second driver support module is capable of operating within a second ODD having a second set of predefined ODD metrics: The vehicle is traveling on a highway (e.g. controlled-access highway), in daylight, at a speed below 60 km/h in a traffic jam.

The first and second rows 75, 76 indicate an ODD fulfilment 72 of the first driver support module and the second driver support module respectively at each time sample (denoted by ODD det.). Thus, the method may comprise determining a current ODD of the vehicle at a sample rate, and determining an ODD fulfilment 72 of each of the first and second driver support modules. In some embodiments, the method may comprise determining a fulfilment of both the first and second ODDs (i.e. a fulfilment of an overlapping ODD). A current ODD is indicated in the third row from the top by the presence of a set of ODD parameters 73a-d, derived from the obtained sensor data. At a first time sample for a determination of an ODD fulfilment, a current ODD of comprises the following ODD parameters: The vehicle is traveling on a highway 73c at a speed of 55 km/h 73b at night time 73a. These ODD parameters are then compared to the ODD metrics of the first and second ODDs in order to determine a fulfilment 72 of the first and second ODDs (and consequently a fulfilment of an overlapping ODD). As indicated (by refs. 71 and 72) in FIG. 5, at the first time sample only the second ODD is fulfilled. Accordingly, since only the first driver support modules are capable of operating within the current ODD of the vehicle, the switching between the first configuration and the second configuration is not enabled (indicated by "OFF" in the bottom row 74).

Moving on, at a second time sample, the current ODD of the vehicle comprises the following parameters: The vehicle is traveling on a highway 73c at a speed of 55 km/h 73b at day time 73a. Accordingly, at the second time sample the first ODD is fulfilled and the second ODD is not fulfilled. Thus, as in the first time sample, the overlapping ODD is not fulfilled and switching between the first and second configurations is not enabled.

At a third time sample, the current ODD of the vehicle comprises the following parameters: The vehicle is traveling on a highway 73c at a speed of 30 km/h at day time 73a in a traffic jam 73d. Accordingly, at the second time sample both of the first and second ODDs are fulfilled, and therefore the overlapping ODD is fulfilled. Thus, the switching between the first and second configurations is enabled, as indicated by the "ON" symbol in the bottom row. A lengthy detailed discussion related to the subsequent time samples are omitted for clarity and conciseness, however, the skilled reader readily understands the concept and is capable of interpreting the illustrated example based on the foregoing disclosure.

Figure 6:
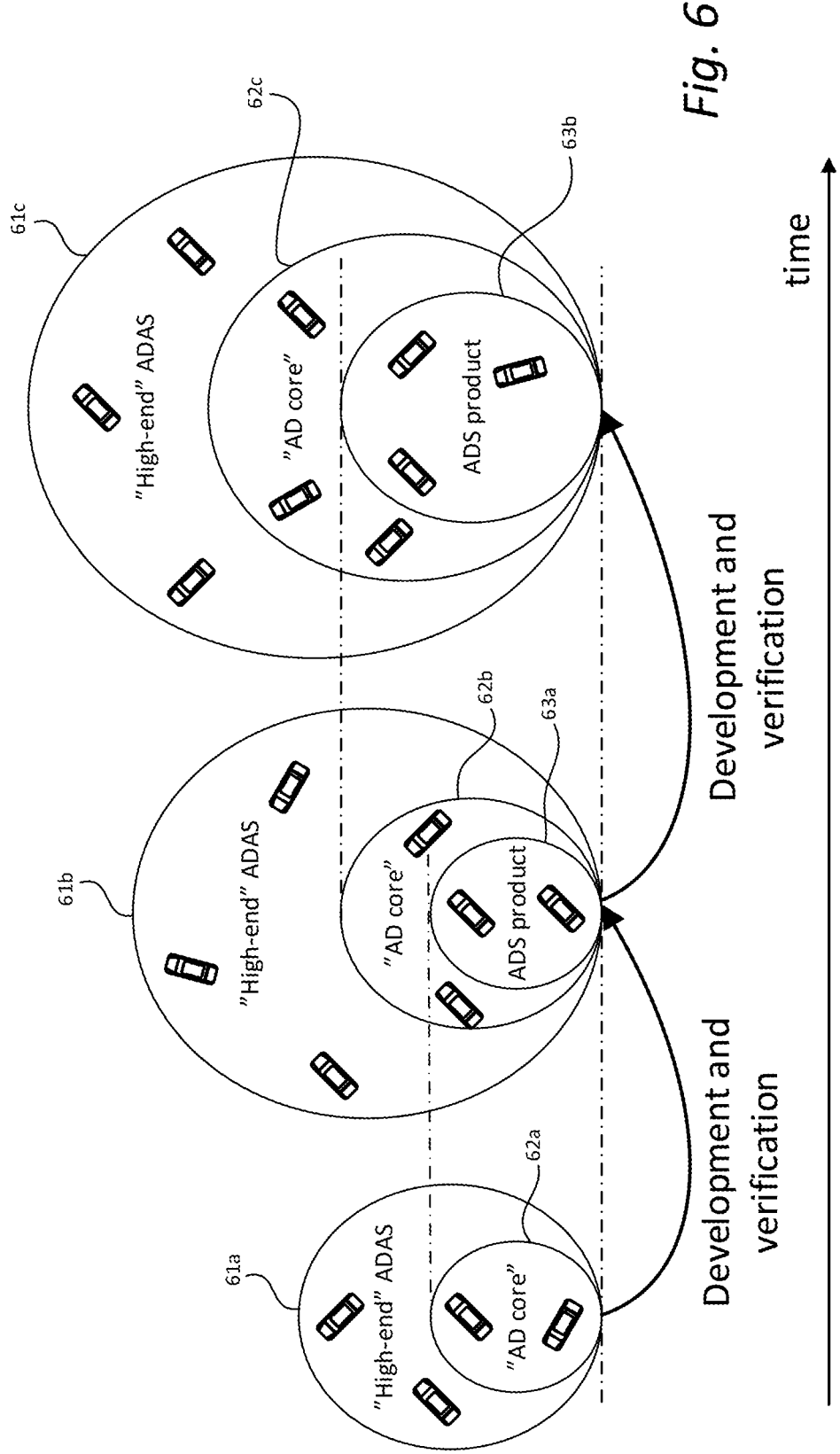
FIG. 6 is a series of schematic Venn diagrams illustrating ODD coverage over time for "high-end" ADAS modules, "AD core" modules, and verified AD modules in accordance with an embodiment of the present disclosure.

FIG. 6 is a series of schematic Venn diagrams illustrating an evolution of driver assistance modules and their ODD coverage over time that may be facilitated by the method, computer-readable storage medium, a control system, and a vehicle comprising such a control system of the present disclosure. In more detail FIG. 6 serves to illustrate how an ODD coverage of "high-end" ADAS 61*a*-61*d* increases over time (i.e. the "high-end" ADAS is capable of operating within a larger ODD over time), and how the ODD coverage 62*a*-*c* of the "AD-core", which may be interpreted as an unverified AD product, increases over time. Moreover, FIG. 6 also illustrates how the ODD coverage of the "mature" ADS product 63*a*-*b* evolves from the "AD core". Also, an overlapping ODD of the "High-end" ADAS 61*a*-*c* and the "AD core" 62*a*-*c* is be the full ODD coverage of the "AD core" 62*a*-*c*.

The proposed switching procedure discussed in the foregoing enables for concentrated and efficient ADS development by expanding the ODD coverage of the ADS product 63*a*-*b* within the ODD coverage of the "high-end" ADAS. In other words, efficient utilization of development and verification resources for moving the automotive industry from "low level" ADS to "high level" ADS is achievable.

Figure 7:
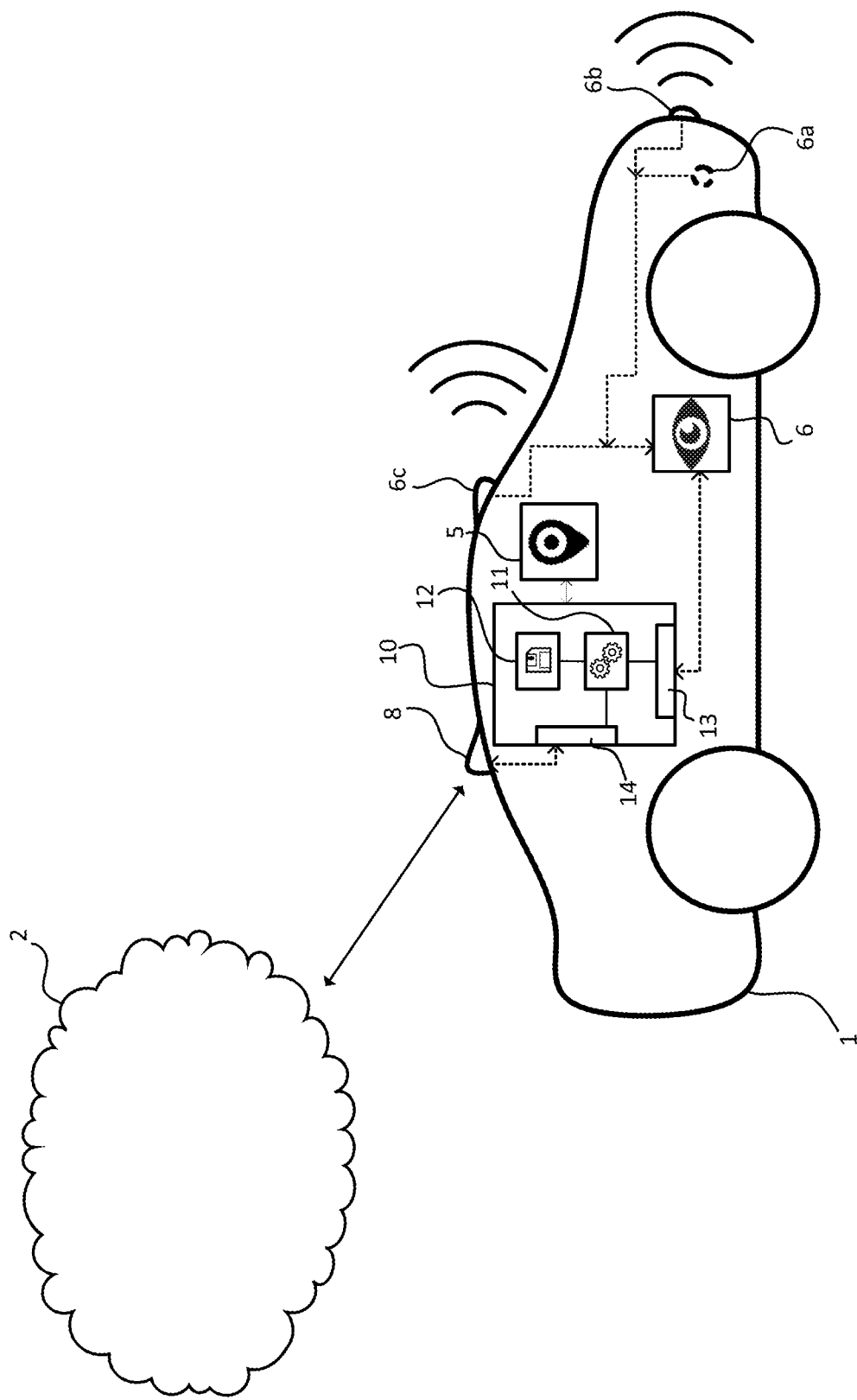
FIG. 7 is a schematic side view illustration of a vehicle comprising a control system for a vehicle in accordance with an embodiment of the present disclosure.

FIG. 7 is a schematic side view of a vehicle 1 comprising a control system 10 for a vehicle 1. The control system 10 has a first driver support module and a second driver support module, each of which is configured for an overlapping ODD. The vehicle 1 further comprises a perception system 6 and a localization system 5. A perception system 6 is in the present context to be understood as a system responsible for acquiring raw sensor data from on sensors 6*a*, 6*b*, 6*c* such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

The control device 10 comprises one or more processors 11, a memory 12, a sensor interface 13 and a communication interface 14. The processor(s) 11 may also be referred to as a control circuit 11 or control circuitry 11. The control circuit 11 is configured to execute instructions stored in the memory 12 to perform a method for controlling a vehicle according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is further configured to obtain sensor data from the perception system 6 and/or the localization system of the vehicle 1. The sensor data comprises information about a surrounding environment of the vehicle. The control circuitry 11 is further configured to determine current fulfilment of an overlapping ODD based on the obtained sensor data. Moreover, if the overlapping ODD is fulfilled, the control circuitry 11 is configured to switch between a first configuration where the first driver support module is active and the second driver support module is inactive, and a second configuration where the first driver support module is inactive and the second driver support module is active. The switching between the first configuration and the second configuration is based on a switching protocol in order to perform closed loop testing of the second driver support module for at least portion of a time period that the vehicle 1 is within the overlapping ODD.

An active driver support module is arranged to generate control signals for a control system of the vehicle in order to control at least one of a steering angle of the vehicle 1, an acceleration of the vehicle 1, and a deceleration of the vehicle 1. As mentioned, the sensor data may comprise vehicle data (e.g. vehicle speed, vehicle heading, etc.), a geographical location of the vehicle, external object data (e.g. presence of other vehicles, relative speed difference between the ego-vehicle 1 and surrounding vehicle, presence of pedestrians, cyclists, etc.), map data, and any other data suitable for determining a current ODD of the vehicle 1. Even though the control circuitry 11 is here illustrated as an in-vehicle system, some or all of the components may be located remote (e.g. cloud-based solution) to the vehicle in order to increase computational power.

Further, the vehicle 1 may be connected to external network(s) 2 via for instance a wireless link (e.g. for retrieving map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the control system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as Wi-Fi, LoRa, Zigbee, Bluetooth, or similar mid/short range technologies.

Accordingly, it should be understood that parts of the described solution may be implemented either in the vehicle 1, in a system located external the vehicle 1, or in a combination of internal and external the vehicle 1; for instance in a server in communication with the vehicle 1, a so called cloud solution. For instance, sensor data may be sent to an external system and that system performs the some or all of the necessary steps to determine an overlapping ODD fulfilment. The different modules and steps of the embodiments may be combined in other combinations than those described.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

What is claimed is:

1. A method for controlling a control system of a vehicle having a first driver support module and a second driver support module, wherein the first driver support module has a first operational design domain (ODD) and the second driver support module has a second ODD, wherein the first and second ODD defines conditions in which the first and second driver support module are allowed to operate in, the method comprising:
    obtaining sensor data comprising information about a surrounding environment of the vehicle;
    determining a fulfilment of an overlapping ODD, wherein the overlapping ODD is an overlap between the first ODD and the second ODD, based on the obtained sensor data; and
    in response to the overlapping ODD being fulfilled, switching between a first configuration where the first driver support module is active and the second driver support module is inactive, and a second configuration where the first driver support module is inactive and the second driver support module is active,
        wherein the switching between the first configuration and the second configuration is based on a switching protocol in order to perform closed loop testing of the second driver support module for at least portion of a time period that the vehicle is within an environment that fulfils the overlapping ODD;
        wherein the switching protocol comprises a predefined time scheme comprising instructions for having the second configuration selected for a duration in a range of 50% to 90% of the time period, and having the first configuration selected for a remainder of the time period,
        wherein the first ODD and the second ODD comprise operating domains in which an automated or a semi-automated driving system comprises an operational design domain (ODD) in which an automated or a semi-automated driving system is designed to function according to at least a geographical function and a connectivity function.

2. The method according to claim 1, wherein the sensor data is obtained from:
    a perception system comprising at least one sensor device configured to monitor the surrounding environment of the vehicle, and
    a localization system configured to determine a geographical location of the vehicle.

3. The method according to claim 1, wherein the overlapping ODD comprises an overlapping set of predefined ODD metrics, and wherein the method further comprises:
    comparing a set of ODD parameters derived from the obtained sensor data with the overlapping set of predefined ODD metrics in order to determine the fulfilment of the overlapping ODD.

4. The method according to claim 1, wherein an active driver support module is arranged to generate control signals for the control system of the vehicle in order to control at least one of a steering angle of the vehicle, an acceleration of the vehicle, and a deceleration of the vehicle.

5. The method according to claim 1, wherein the first driver support module has a first defined performance level and the second driver support module has a second defined performance level, the first defined performance level being lower than the second defined performance level.

6. The method according to claim 1, further comprising:
prior to switching between the first configuration and the second configuration:
running the second driver support module in a background mode while having the first driver support module active in order to perform a verification of a compatibility between the fulfilled overlapping ODD and the second driver support module.

7. The method according to claim 1, wherein the information about the surrounding environment comprises at least one of a geographical location of the vehicle, weather data, a traffic density, a road type, and a relative speed of surrounding vehicles.

8. A non-transitory computer-readable storage medium storing one or more programs configured to be executed by one or more processors of a vehicle control system, the one or more programs comprising instructions for performing a method, the method comprising:
obtaining sensor data comprising information about a surrounding environment of a vehicle, wherein
the vehicle control system is in the vehicle having a first driver support module and a second driver support module, and
the first driver support module having a first operational design domain (ODD) and the second driver support module having a second ODD, wherein the first and second ODD defines conditions in which the first and second driver support module are allowed to operate;
determining a fulfilment of an overlapping ODD, wherein the overlapping ODD is an overlap between the first ODD and the second ODD, based on the obtained sensor data; and
in response to the overlapping ODD being fulfilled, switching between a first configuration where the first driver support module is active and the second driver support module is inactive, and a second configuration where the first driver support module is inactive and the second driver support module is active,
wherein the switching between the first configuration and the second configuration is based on a switching protocol in order to perform closed loop testing of the second driver support module for at least portion of a time period that the vehicle is within an environment that fulfils the overlapping ODD;
wherein the switching protocol comprises a predefined time scheme comprising instructions for having the second configuration selected for a duration in a range of 50% to 90% of the time period, and having the first configuration selected for a remainder of the time period,
wherein the first ODD and the second ODD comprise operating domains in which an automated or a semi-automated driving system comprises an operational design domain (ODD) in which an automated or a semi-automated driving system is designed to function according to at least a geographical function and a connectivity function.

9. A control system for a vehicle, the control system comprising:
a first driver support module having a first operational design domain (ODD) and a second driver support module having a second ODD, wherein the first and second ODD defines conditions in which the first and second driver support module are allowed to operate;
control circuitry configured to:
obtain sensor data comprising information about a surrounding environment of the vehicle;
determine a fulfilment of an overlapping ODD, wherein the overlapping ODD is an overlap between the first ODD and the second ODD, based on the obtained sensor data; and
in response to the overlapping ODD being fulfilled, switch between a first configuration where the first driver support module is active and the second driver support module is inactive, and a second configuration where the first driver support module is inactive and the second driver support module is active,
wherein the switching between the first configuration and the second configuration is based on a switching protocol in order to perform closed loop testing of the second driver support module for at least portion of a time period that the vehicle is within an environment that fulfils the overlapping ODD;
wherein the switching protocol comprises a predefined time scheme comprising instructions for having the second configuration selected for a duration in a range of 50% to 90% of the time period, and having the first configuration selected for a remainder of the time period,
wherein the first ODD and the second ODD comprise operating domains in which an automated or a semi-automated driving system comprises an operational design domain (ODD) in which an automated or a semi-automated driving system is designed to function according to at least a geographical function and a connectivity function.

10. The control system according to claim 9, wherein the overlapping ODD comprises an overlapping set of predefined ODD metrics, and wherein the control circuitry is further configured to:
compare a set of ODD parameters derived from the obtained sensor data with the overlapping set of predefined ODD metrics in order to determine the fulfilment of the overlapping ODD.

11. The control system according to claim 9, wherein an active driver support module is arranged to generate control signals for the control system of the vehicle in order to control at least one of a steering angle of the vehicle, an acceleration of the vehicle, and a deceleration of the vehicle.

12. The control system according to claim 9, wherein the first driver support module has a first defined performance level and the second driver support module has a second defined performance level, the first defined performance level being lower than the second defined performance level.

13. A vehicle, comprising:
a perception system comprising at least one sensor device configured to monitor a surrounding environment of the vehicle, a localization system configured to determine a geographical location of the vehicle; and
a control system comprising:
a first driver support module having a first operational design domain (ODD) and a second driver support module having a second ODD, wherein the first and second ODD defines conditions in which the first and second driver support module are allowed to operate in;
control circuitry configured to:
obtain sensor data comprising information about a surrounding environment of the vehicle;

determine a fulfilment of an overlapping ODD, wherein the overlapping ODD is an overlap between the first ODD and the second ODD, based on the obtained sensor data; and in response to the overlapping ODD being fulfilled, switch between a first configuration where the first driver support module is active and the second driver support module is inactive, and a second configuration where the first driver support module is inactive and the second driver support module is active, wherein the switching between the first configuration and the second configuration is based on a switching protocol in order to perform closed loop testing of the second driver support module for at least portion of a time period that the vehicle is within an environment that fulfils the overlapping ODD;

wherein the switching protocol comprises a predefined time scheme comprising instructions for having the second configuration selected for a duration in a range of 50% to 90% of the time period, and having the first configuration selected for a remainder of the time period, wherein at least one of the first ODD and the second ODD comprises operating domains in which an automated or a semi-automated driving system comprises an operational design domain (ODD) in which an automated or a semi-automated driving system is designed to function according to at least a geographical function and a connectivity function.

* * * * *